(12) United States Patent
Brittingham et al.

(10) Patent No.: US 8,007,245 B2
(45) Date of Patent: Aug. 30, 2011

(54) SHANK SHAPE FOR A TURBINE BLADE AND TURBINE INCORPORATING THE SAME

(75) Inventors: Robert Alan Brittingham, Piedmont, SC (US); Linda Jean Farral, Greenville, SC (US); Chistopher Paul Keener, Mauldin, SC (US); Holly Renae Davis, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1187 days.

(21) Appl. No.: 11/987,315

(22) Filed: Nov. 29, 2007

(65) Prior Publication Data

US 2009/0142195 A1 Jun. 4, 2009

(51) Int. Cl.
*F01D 5/14* (2006.01)

(52) U.S. Cl. ............... 416/239; 416/241 R; 416/243

(58) Field of Classification Search .............. 416/239, 416/241 R, 243
See application file for complete search history.

(56) References Cited

U.S. PATENT DOCUMENTS

| | | | |
|---|---|---|---|
| 5,980,209 A | 11/1999 | Barry et al. | |
| 7,090,466 B2 * | 8/2006 | Honkomp et al. | 416/193 A |
| 2008/0286109 A1 * | 11/2008 | Keith et al. | 416/239 |
| 2009/0060714 A1 * | 3/2009 | Moors | 415/115 |
| 2010/0166561 A1 * | 7/2010 | Boyer | 416/219 R |

OTHER PUBLICATIONS

U.S. Application of Brittingham et al.; U.S. Appl. No. 11/987,163, filed Nov. 28, 2007.
U.S. Application of Delong et al.; U.S. Appl. No. 11/882,373, filed Aug. 1, 2007.
U.S. Application of Chiruato et al.; U.S. Appl. No. 11/892,355, filed Aug. 22, 2007.
U.S. Application of Arness et al.; U.S. Appl. No. 11/882,531, filed Aug. 2, 2007.

* cited by examiner

*Primary Examiner* — Ninh H Nguyen
(74) *Attorney, Agent, or Firm* — Nixon & Vanderhye PC

(57) ABSTRACT

A turbine includes a turbine wheel having a plurality of buckets, each of the buckets including a bucket airfoil, a bucket dovetail to connect the bucket to a turbine wheel and a shank shape to connect the airfoil to the bucket dovetail, the shank having an uncoated nominal profile including a concave, pressure side, substantially in accordance with Cartesian values of X, Y and Z' set forth in Table I wherein the Z' values are non-dimensional values in a range from 0 to 1 convertible to Z distances in inches by multiplying the Z' values by shank height in inches, and a convex, suction side, substantially in accordance with Cartesian values of X, Y and Z' set forth in Table II wherein the Z' values are non-dimensional values in a range from 0 to 1 convertible to Z distances in inches by multiplying the Z' values by the shank height in inches. The X and Y are distances in inches which, when connected by smooth continuing arcs, define a shank profile section at each distance Z, the profile sections being joined smoothly with one another to form a complete shank shape.

19 Claims, 4 Drawing Sheets

SHANK SHAPE FOR A TURBINE BLADE AND TURBINE INCORPORATING THE SAME

BACKGROUND OF THE INVENTION

The present invention relates to a bucket stage of a turbine and particularly relates to a shank shape for a second stage turbine bucket. While the invention is intended in particular for a gas turbine, the use of a scaled design could be applicable to a steam turbine or aircraft engine.

Many system requirements must be met for each stage of the hot gas path section of a gas turbine in order to meet design goals including overall improved efficiency and airfoil loading. Particularly, the buckets of the second stage of the turbine section must meet the operating requirements for that particular stage and also be capable of efficient manufacture.

BRIEF DESCRIPTION OF THE INVENTION

The invention may be embodied in an article of manufacture including a bucket airfoil, a bucket dovetail to connect the bucket to a turbine wheel and a shank shape to connect the airfoil to the bucket dovetail, said shank having an uncoated nominal profile including a concave, pressure side, substantially in accordance with Cartesian values of X, Y and Z' set forth in Table I wherein the Z' values are non-dimensional values in a range from 0 to 1 convertible to Z distances in inches by multiplying the Z' values by shank height in inches, and wherein X and Y are distances in inches which, when connected by smooth continuing arcs, define shank profile section at each distance Z, the profile section Z distances being joined smoothly with one another to form a complete concave, pressure side, shank shape.

The invention may also be embodied in an article of manufacture including a bucket airfoil, a bucket dovetail to connect the bucket to a turbine wheel and a shank shape to connect the airfoil to the bucket dovetail, said shank having an uncoated nominal profile including a convex, suction side, substantially in accordance with Cartesian values of X, Y and Z' set forth in Table II wherein the Z' values are non-dimensional values in a range from 0 to 1 convertible to Z distances in inches by multiplying the Z' values by shank height in inches, and wherein X and Y are distances in inches which, when connected by smooth continuing arcs, define a shank profile section at each distance Z, the profile sections being joined smoothly with one another to form a complete convex, suction side, shank shape.

The invention may further be in embodied in an article of manufacture comprising a turbine wheel having a plurality of buckets, each of said buckets including a bucket airfoil, a bucket dovetail to connect the bucket to a turbine wheel and a shank shape to connect the airfoil to the bucket dovetail, said shank having an uncoated nominal profile including a concave, pressure side, substantially in accordance with Cartesian values of X, Y and Z' set forth in Table I wherein the Z' values are non-dimensional values in a range from 0 to 1 convertible to Z distances in inches by multiplying the Z' values by shank height in inches, and wherein X and Y are distances in inches which, when connected by smooth continuing arcs, define a shank profile section at each distance Z, the profile sections being joined smoothly with one another to form a complete concave, pressure side, shank shape, and said shank nominal profile further including a convex, suction side, substantially in accordance with Cartesian values of X, Y and Z' set forth in Table II wherein the Z' values are non-dimensional values in a range from 0 to 1 convertible to Z distances in inches by multiplying the Z' values by shank height in inches, and wherein X and Y are distances in inches which, when connected by smooth continuing arcs, define a shank profile section at each distance Z, the profile sections being joined smoothly with one another to form a complete convex, suction side, shank shape.

BRIEF DESCRIPTION OF THE DRAWINGS

These and other objects and advantages of this invention, will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
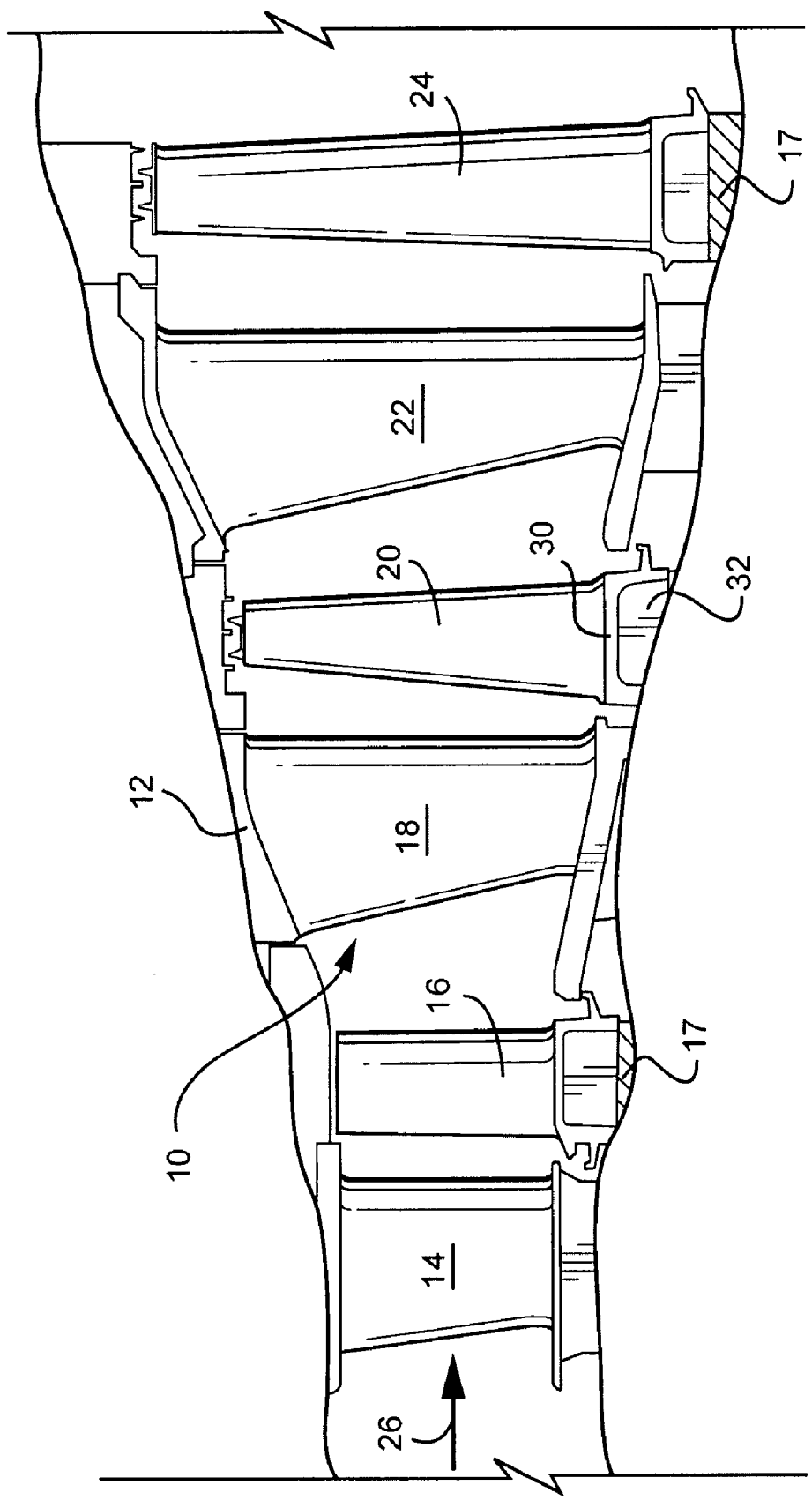
FIG. 1 is a schematic representation of a hot gas path through multiple stages of a gas turbine and illustrates a second stage bucket airfoil according to an example embodiment of the present invention.

Referring now to the drawings, particularly to FIG. 1, there is illustrated a hot gas path, generally designated 10, of a gas turbine 12 including a plurality of turbine stages. Three stages are illustrated. For example, the first stage comprises a plurality of circumferentially spaced nozzles 14 and buckets 16. The nozzles are circumferentially spaced one from the other and fixed about the axis of the rotor. The first stage buckets 16, of course, are mounted on the turbine rotor 17. A second stage of the turbine 12 is also illustrated, including a plurality of circumferentially spaced nozzles 18 and a plurality of circumferentially spaced buckets 20 mounted on the rotor. The third stage is also illustrated including a plurality of circumferentially spaced nozzles 22 and buckets 24 mounted on rotor 17. It will be appreciated that the nozzles and buckets lie in the hot gas path 10 of the turbine, the direction of flow of the hot gas through the hot gas path 10 being indicated by the arrow 26.

Figure 2:
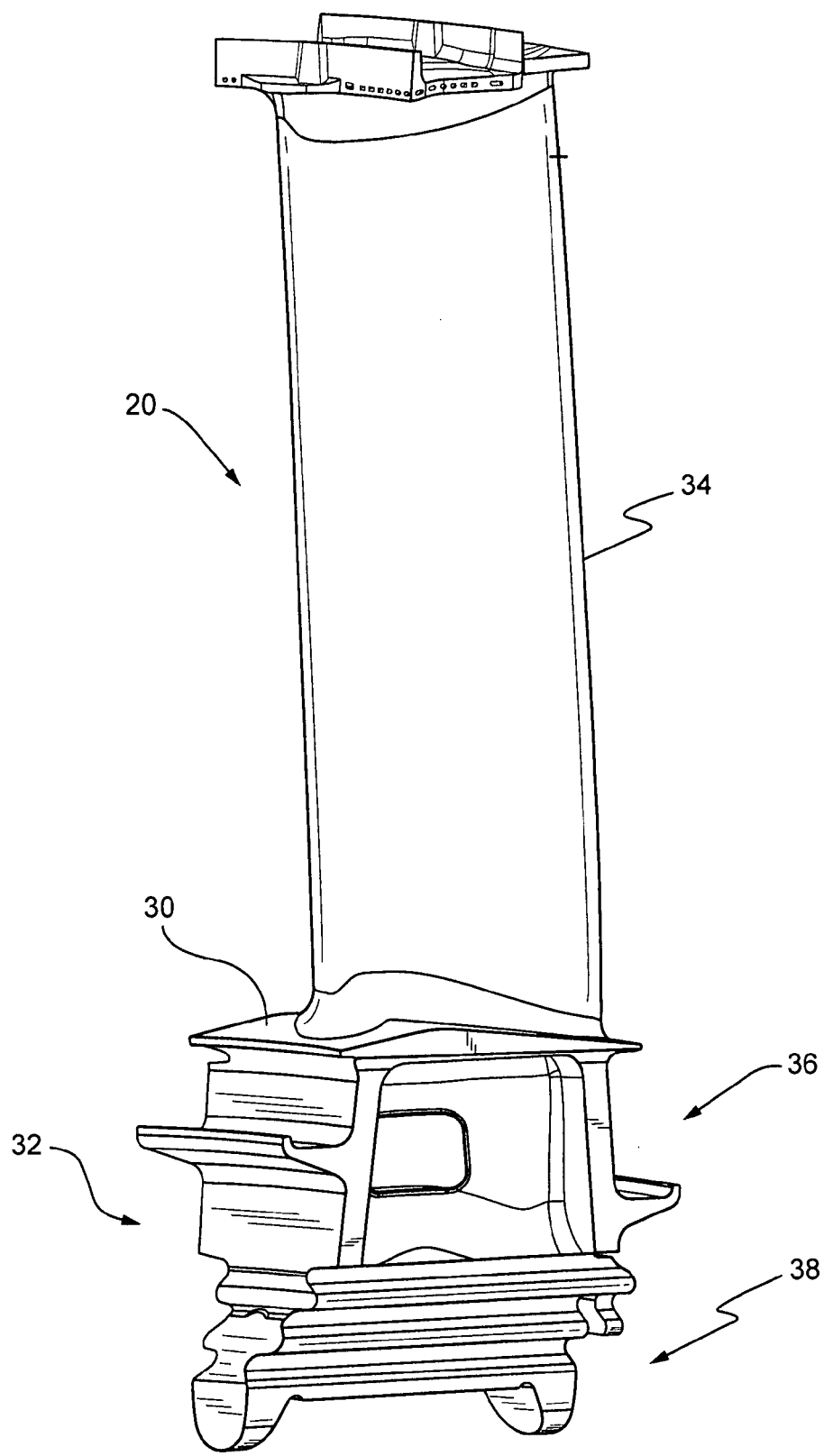
FIG. 2 is a perspective view of a bucket having a shank according to an example embodiment of the present invention.

Referring to FIG. 2, it will be appreciated that the buckets, for example, the buckets 20 of the second stage have a bucket root 32 mounted on a rotor wheel, (not shown in detail) forming part of rotor 17 and include platforms 30. It will also be appreciated that each bucket 20 has a bucket airfoil 34, as illustrated in FIG. 2, and that the bucket root is comprised of the bucket shank 36 and bucket dovetail 38.

A gas turbine hot gas path (for example a 7FA+e gas turbine) requires a second stage airfoil that meets system requirements of efficiency and loading. An airfoil with accompanying tip shroud was designed to meet these requirements but further necessitated a shank, which is the subject of the present disclosure, to connect the airfoil to the bucket dovetail, which connects the bucket to the turbine wheel, as mention of above.

To define the shank shape of each second stage bucket shank, there is a unique set or loci of points in space that meets the stage requirements and can be manufactured. This unique loci of points meet the requirements for stage efficiency and is arrived at by iteration between aerodynamic and mechanical loadings enabling the turbine to run in an efficient, safe and smooth manner. These points are unique and specific to the system and are not obvious to those skilled in the art.

Figure 3:
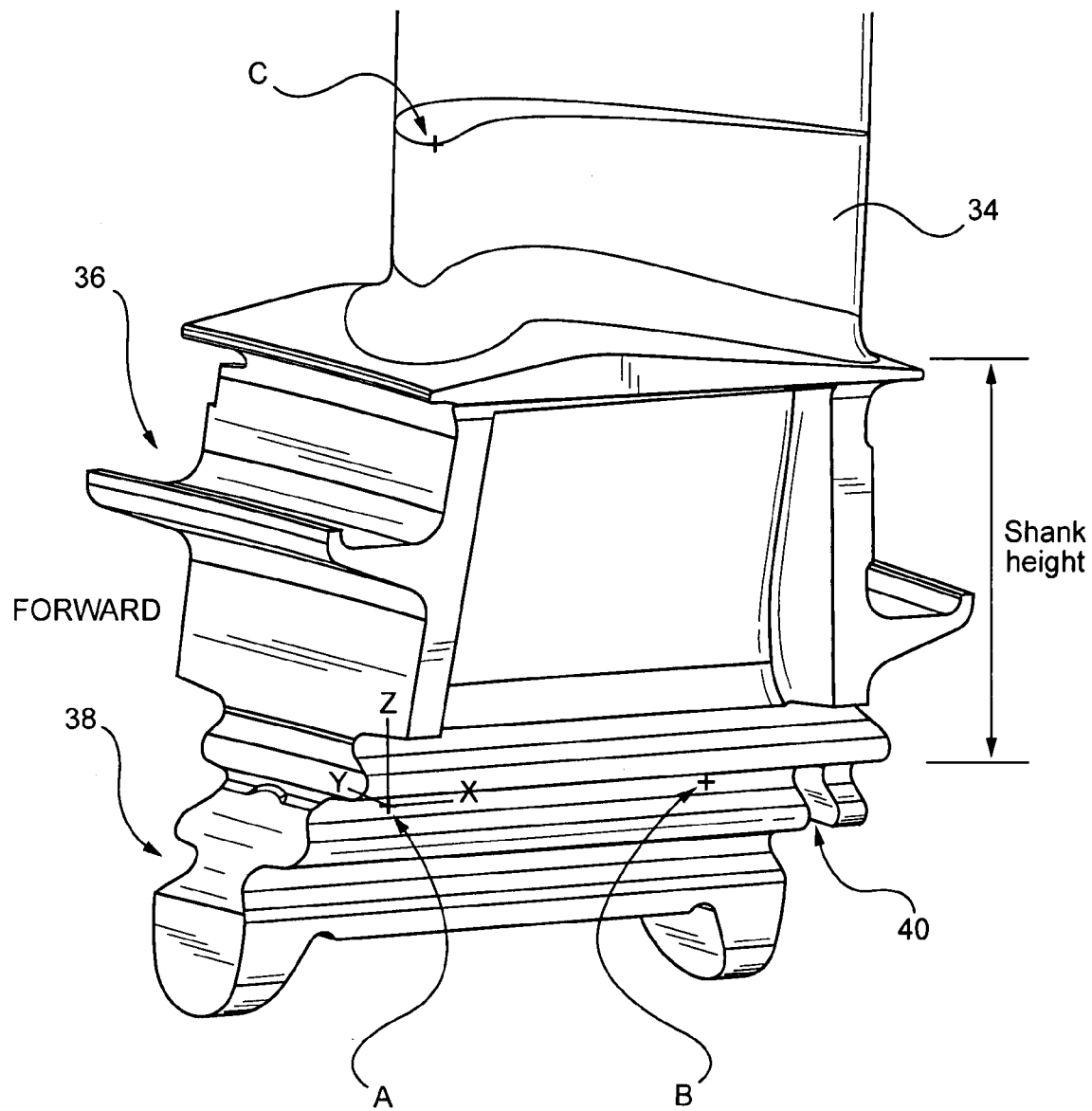
FIGS. 3 and 4 are perspective and elevational views, respectfully, showing coordinate origin and orientation for shank points according to an example of embodiment of the invention.
Figure 4:
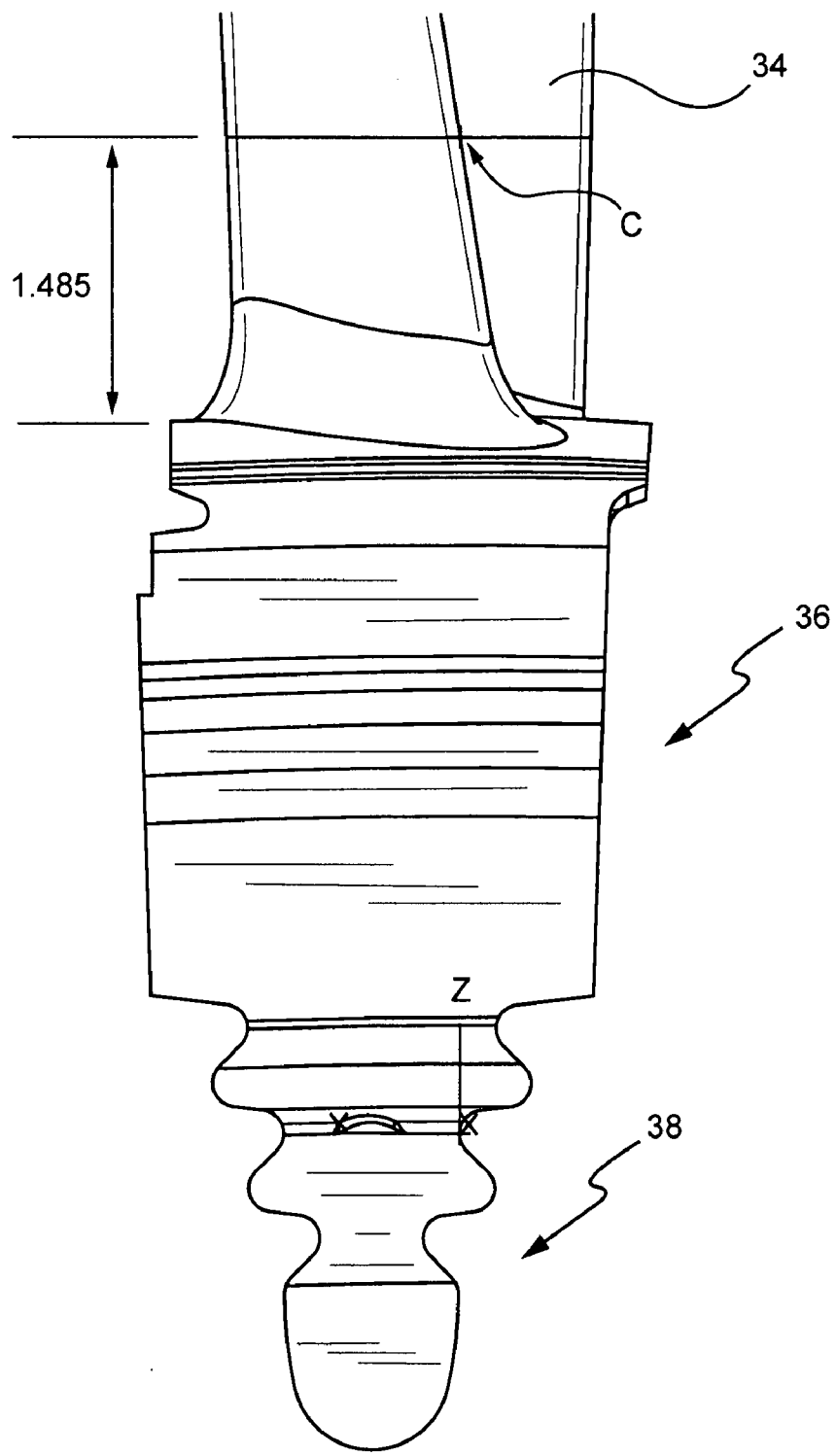

The loci which define the bucket shank profile of the invention comprise a set of 450 points with X, Y and Z' dimensions relative to the reference origin coordinate system established as shown in FIGS. 3 and 4. More specifically, the points are on the pressure and suction side surfaces of the shank and are relative to the coordinate origin as shown in FIGS. 3 and 4. The coordinate system is defined by 3 points on the finished airfoil shape. The X-axis is defined by 2 points on the minimum neck of the dovetail just below the top dovetail load bearing surface, on the concave side of the blade as shown by points A and B in FIG. 3. A point on the Z-axis, C, is defined as the intersection of the mean camber surface with the leading edge at a distance of 1.485 inches from the outermost extent of the platform surface (in a radial direction). The Y-axis is established by the right hand rule from the X and Z axes. The Z-axis coordinates are normalized by the shank height (FIG. 3) which in the illustrated example embodiment is defined as the distance from the forwardmost intersection of the X-axis and the axial retention groove 40 to the inner flowpath surface, measured along a line parallel to the Z-axis. In this example, the shank height measurement is 3.445 inches.

As mentioned above, the Cartesian coordinate system of X, Y and Z' values given in Tables I and II below define the pressure and suction side surface profile of the bucket shank at various locations along its length. The coordinate values for the X and Y coordinates are set forth in inches in Tables I and II, although other units of dimensions may be used when the values are appropriately converted. The Z values are set forth in Tables I and II in non-dimensional form (Z') in a range from 0 to 1. More specifically, the non-dimensionalized Z' coordinate values range from 0.209 to 0.940 due to the way in which the shank height has been defined. To convert the Z' value to a Z coordinate value, e.g., in inches, the non-dimensional Z' values given in Tables I and II are multiplied by the Z length of the shank in inches (3.445 inches in this example embodiment).

As described above, the Cartesian coordinate system has orthogonally-related X, Y and Z axes. The X axis has been defined as parallel to the bucket dovetail, which in the present example embodiment is not parallel to the turbine rotor centerline.

By defining X and Y coordinate values at selected locations in a Z direction normal to the X, Y plane, the profile section of the bucket shank, at each Z distance along the length of the shank can be ascertained. By connecting the X and Y values with smooth continuing arcs, each profile section at each distance Z is fixed. The shank profiles of the various surface locations between the distances Z are determined by smoothly connecting the adjacent profile sections to one another to form the shank profile.

The Table I and Table II values are generated and shown to three decimal places for determining the profile of the shank. As the bucket heats up in service, mechanical and thermal loading will cause a change in the X, Y and Z's. Accordingly, the values for the profile given in Tables I and II represent ambient, non-operating or non-hot conditions and are for an uncoated shank.

There are typical manufacturing tolerances as well as coatings which must be accounted for in the actual profile of the shank. Each section is joined smoothly with the other sections to form the complete shank shape on pressure and suction sides. It will therefore be appreciated that +/− typical manufacturing tolerances, i.e., +/− values, including any coating thicknesses, are additive to the X and Y values given in Tables I and II below. Accordingly, a distance of +/−0.067 inches in a direction normal to any surface location along the shank profile defines a shank envelope for this particular bucket shank design and turbine, i.e., a range of variation between measured points on the actual shank surface at nominal cold or room temperature and the ideal position of those points as given in the Tables below at the same temperature. The bucket shank design is robust to this range of variation without impairment of mechanical functions.

It should be noted that the extensions of the shank surfaces are not included as multiple methods of extensions exist for essentially the same shank shape. Furthermore, fillets between the shank surface and any appendages, e.g., an integral coverplate, are not included in the definition of the shank shape.

TABLE I

| X | Y | Z' |
|---|---|---|
| −0.140 | −0.198 | 0.209 |
| −0.018 | −0.196 | 0.209 |
| 0.104 | −0.194 | 0.209 |
| 0.227 | −0.192 | 0.209 |
| 0.349 | −0.189 | 0.209 |
| 0.471 | −0.186 | 0.209 |
| 0.593 | −0.184 | 0.209 |
| 0.715 | −0.182 | 0.209 |
| 0.837 | −0.180 | 0.209 |
| 0.959 | −0.178 | 0.209 |
| 1.082 | −0.177 | 0.209 |
| 1.204 | −0.176 | 0.209 |
| 1.326 | −0.175 | 0.209 |
| 1.448 | −0.175 | 0.209 |
| 1.570 | −0.174 | 0.209 |
| 1.693 | −0.173 | 0.209 |
| 1.815 | −0.172 | 0.209 |
| 1.937 | −0.171 | 0.209 |
| 2.059 | −0.169 | 0.209 |
| 2.181 | −0.167 | 0.209 |
| 2.303 | −0.166 | 0.209 |
| 2.426 | −0.165 | 0.209 |
| 2.548 | −0.164 | 0.209 |
| 2.670 | −0.164 | 0.209 |
| 2.792 | −0.165 | 0.209 |
| 2.914 | −0.166 | 0.209 |
| 3.036 | −0.167 | 0.209 |
| 3.159 | −0.168 | 0.209 |
| 3.281 | −0.168 | 0.209 |
| 3.403 | −0.167 | 0.209 |
| −0.135 | −0.085 | 0.313 |
| −0.015 | −0.074 | 0.313 |
| 0.104 | −0.063 | 0.313 |
| 0.224 | −0.053 | 0.313 |
| 0.343 | −0.045 | 0.313 |
| 0.463 | −0.038 | 0.313 |
| 0.583 | −0.031 | 0.313 |
| 0.703 | −0.026 | 0.313 |
| 0.823 | −0.022 | 0.313 |
| 0.942 | −0.018 | 0.313 |
| 1.062 | −0.015 | 0.313 |
| 1.182 | −0.013 | 0.313 |
| 1.302 | −0.012 | 0.313 |
| 1.422 | −0.012 | 0.313 |
| 1.542 | −0.013 | 0.313 |
| 1.662 | −0.016 | 0.313 |
| 1.782 | −0.019 | 0.313 |
| 1.902 | −0.024 | 0.313 |
| 2.022 | −0.029 | 0.313 |
| 2.141 | −0.034 | 0.313 |
| 2.261 | −0.039 | 0.313 |
| 2.381 | −0.043 | 0.313 |
| 2.501 | −0.048 | 0.313 |
| 2.621 | −0.054 | 0.313 |
| 2.740 | −0.062 | 0.313 |
| 2.860 | −0.070 | 0.313 |
| 2.980 | −0.078 | 0.313 |
| 3.099 | −0.086 | 0.313 |

TABLE I-continued

| X | Y | Z' |
|---|---|---|
| 3.219 | −0.092 | 0.313 |
| 3.339 | −0.096 | 0.313 |
| −0.110 | −0.052 | 0.418 |
| 0.006 | −0.029 | 0.418 |
| 0.122 | −0.006 | 0.418 |
| 0.239 | 0.014 | 0.418 |
| 0.356 | 0.032 | 0.418 |
| 0.473 | 0.048 | 0.418 |
| 0.591 | 0.062 | 0.418 |
| 0.709 | 0.075 | 0.418 |
| 0.827 | 0.086 | 0.418 |
| 0.945 | 0.095 | 0.418 |
| 1.063 | 0.103 | 0.418 |
| 1.181 | 0.109 | 0.418 |
| 1.300 | 0.111 | 0.418 |
| 1.418 | 0.111 | 0.418 |
| 1.536 | 0.107 | 0.418 |
| 1.655 | 0.099 | 0.418 |
| 1.772 | 0.088 | 0.418 |
| 1.890 | 0.074 | 0.418 |
| 2.008 | 0.060 | 0.418 |
| 2.125 | 0.046 | 0.418 |
| 2.243 | 0.033 | 0.418 |
| 2.361 | 0.022 | 0.418 |
| 2.479 | 0.011 | 0.418 |
| 2.597 | −0.001 | 0.418 |
| 2.714 | −0.016 | 0.418 |
| 2.831 | −0.033 | 0.418 |
| 2.948 | −0.054 | 0.418 |
| 3.065 | −0.074 | 0.418 |
| 3.182 | −0.091 | 0.418 |
| 3.300 | −0.104 | 0.418 |
| −0.079 | −0.049 | 0.522 |
| 0.036 | −0.022 | 0.522 |
| 0.151 | 0.006 | 0.522 |
| 0.265 | 0.035 | 0.522 |
| 0.380 | 0.063 | 0.522 |
| 0.494 | 0.091 | 0.522 |
| 0.609 | 0.117 | 0.522 |
| 0.725 | 0.141 | 0.522 |
| 0.841 | 0.162 | 0.522 |
| 0.958 | 0.179 | 0.522 |
| 1.075 | 0.192 | 0.522 |
| 1.193 | 0.201 | 0.522 |
| 1.311 | 0.204 | 0.522 |
| 1.429 | 0.201 | 0.522 |
| 1.546 | 0.193 | 0.522 |
| 1.663 | 0.178 | 0.522 |
| 1.780 | 0.159 | 0.522 |
| 1.896 | 0.138 | 0.522 |
| 2.012 | 0.117 | 0.522 |
| 2.128 | 0.097 | 0.522 |
| 2.245 | 0.080 | 0.522 |
| 2.362 | 0.063 | 0.522 |
| 2.478 | 0.045 | 0.522 |
| 2.594 | 0.022 | 0.522 |
| 2.708 | −0.008 | 0.522 |
| 2.820 | −0.044 | 0.522 |
| 2.932 | −0.082 | 0.522 |
| 3.045 | −0.117 | 0.522 |
| 3.160 | −0.144 | 0.522 |
| 3.276 | −0.163 | 0.522 |
| −0.042 | −0.066 | 0.627 |
| 0.072 | −0.039 | 0.627 |
| 0.186 | −0.008 | 0.627 |
| 0.299 | 0.026 | 0.627 |
| 0.411 | 0.062 | 0.627 |
| 0.523 | 0.098 | 0.627 |
| 0.635 | 0.133 | 0.627 |
| 0.748 | 0.165 | 0.627 |
| 0.862 | 0.193 | 0.627 |
| 0.978 | 0.216 | 0.627 |
| 1.094 | 0.234 | 0.627 |
| 1.211 | 0.244 | 0.627 |
| 1.329 | 0.248 | 0.627 |
| 1.446 | 0.244 | 0.627 |
| 1.563 | 0.232 | 0.627 |
| 1.679 | 0.214 | 0.627 |
| 1.795 | 0.191 | 0.627 |
| 1.910 | 0.165 | 0.627 |
| 2.025 | 0.140 | 0.627 |
| 2.140 | 0.115 | 0.627 |
| 2.254 | 0.090 | 0.627 |
| 2.369 | 0.062 | 0.627 |
| 2.482 | 0.030 | 0.627 |
| 2.593 | −0.009 | 0.627 |
| 2.702 | −0.054 | 0.627 |
| 2.809 | −0.101 | 0.627 |
| 2.918 | −0.147 | 0.627 |
| 3.029 | −0.187 | 0.627 |
| 3.142 | −0.217 | 0.627 |
| 3.258 | −0.239 | 0.627 |
| −0.004 | −0.091 | 0.731 |
| 0.110 | −0.062 | 0.731 |
| 0.222 | −0.028 | 0.731 |
| 0.333 | 0.011 | 0.731 |
| 0.443 | 0.053 | 0.731 |
| 0.552 | 0.095 | 0.731 |
| 0.662 | 0.137 | 0.731 |
| 0.773 | 0.176 | 0.731 |
| 0.885 | 0.210 | 0.731 |
| 0.999 | 0.238 | 0.731 |
| 1.115 | 0.259 | 0.731 |
| 1.231 | 0.272 | 0.731 |
| 1.348 | 0.276 | 0.731 |
| 1.466 | 0.270 | 0.731 |
| 1.582 | 0.256 | 0.731 |
| 1.698 | 0.234 | 0.731 |
| 1.812 | 0.207 | 0.731 |
| 1.926 | 0.178 | 0.731 |
| 2.039 | 0.148 | 0.731 |
| 2.152 | 0.117 | 0.731 |
| 2.265 | 0.083 | 0.731 |
| 2.376 | 0.045 | 0.731 |
| 2.485 | 0.001 | 0.731 |
| 2.591 | −0.050 | 0.731 |
| 2.695 | −0.104 | 0.731 |
| 2.799 | −0.157 | 0.731 |
| 2.905 | −0.207 | 0.731 |
| 3.014 | −0.251 | 0.731 |
| 3.126 | −0.287 | 0.731 |
| 3.240 | −0.316 | 0.731 |
| 0.034 | −0.113 | 0.836 |
| 0.146 | −0.078 | 0.836 |
| 0.257 | −0.037 | 0.836 |
| 0.365 | 0.009 | 0.836 |
| 0.472 | 0.058 | 0.836 |
| 0.579 | 0.108 | 0.836 |
| 0.686 | 0.157 | 0.836 |
| 0.904 | 0.244 | 0.836 |
| 1.017 | 0.278 | 0.836 |
| 1.132 | 0.303 | 0.836 |
| 1.249 | 0.317 | 0.836 |
| 1.367 | 0.318 | 0.836 |
| 1.484 | 0.307 | 0.836 |
| 1.600 | 0.287 | 0.836 |
| 1.715 | 0.260 | 0.836 |
| 1.829 | 0.231 | 0.836 |
| 1.943 | 0.201 | 0.836 |
| 2.057 | 0.171 | 0.836 |
| 2.169 | 0.138 | 0.836 |
| 2.281 | 0.099 | 0.836 |
| 2.389 | 0.054 | 0.836 |
| 2.494 | −0.001 | 0.836 |
| 2.595 | −0.062 | 0.836 |
| 2.694 | −0.125 | 0.836 |
| 2.793 | −0.188 | 0.836 |
| 2.895 | −0.247 | 0.836 |
| 3.000 | −0.300 | 0.836 |
| 3.108 | −0.347 | 0.836 |
| 3.219 | −0.386 | 0.836 |
| 0.067 | −0.118 | 0.940 |
| 0.178 | −0.077 | 0.940 |
| 0.286 | −0.029 | 0.940 |
| 0.392 | 0.024 | 0.940 |
| 0.496 | 0.079 | 0.940 |

TABLE I-continued

| X | Y | Z' |
|---|---|---|
| 0.600 | 0.136 | 0.940 |
| 0.704 | 0.190 | 0.940 |
| 0.811 | 0.241 | 0.940 |
| 0.920 | 0.287 | 0.940 |
| 1.032 | 0.324 | 0.940 |
| 1.146 | 0.352 | 0.940 |
| 1.263 | 0.366 | 0.940 |
| 1.381 | 0.366 | 0.940 |
| 1.499 | 0.352 | 0.940 |
| 1.614 | 0.329 | 0.940 |
| 1.729 | 0.301 | 0.940 |
| 1.843 | 0.272 | 0.940 |
| 1.958 | 0.242 | 0.940 |
| 2.071 | 0.210 | 0.940 |
| 2.184 | 0.173 | 0.940 |
| 2.293 | 0.129 | 0.940 |
| 2.397 | 0.074 | 0.940 |
| 2.497 | 0.010 | 0.940 |
| 2.593 | −0.058 | 0.940 |
| 2.783 | −0.199 | 0.940 |
| 2.880 | −0.266 | 0.940 |
| 2.981 | −0.327 | 0.940 |
| 3.085 | −0.383 | 0.940 |
| 3.192 | −0.432 | 0.940 |

TABLE II

| X | Y | Z' |
|---|---|---|
| −0.706 | 1.166 | 0.209 |
| −0.570 | 1.166 | 0.209 |
| −0.434 | 1.165 | 0.209 |
| −0.299 | 1.168 | 0.209 |
| −0.163 | 1.175 | 0.209 |
| −0.028 | 1.187 | 0.209 |
| 0.107 | 1.200 | 0.209 |
| 0.242 | 1.211 | 0.209 |
| 0.378 | 1.219 | 0.209 |
| 0.513 | 1.226 | 0.209 |
| 0.649 | 1.231 | 0.209 |
| 0.785 | 1.236 | 0.209 |
| 0.920 | 1.240 | 0.209 |
| 1.056 | 1.244 | 0.209 |
| 1.192 | 1.247 | 0.209 |
| 1.327 | 1.247 | 0.209 |
| 1.463 | 1.245 | 0.209 |
| 1.599 | 1.241 | 0.209 |
| 1.734 | 1.234 | 0.209 |
| 1.870 | 1.224 | 0.209 |
| 2.005 | 1.213 | 0.209 |
| 2.140 | 1.200 | 0.209 |
| 2.275 | 1.186 | 0.209 |
| 2.410 | 1.174 | 0.209 |
| 2.546 | 1.167 | 0.209 |
| 2.681 | 1.166 | 0.209 |
| 2.817 | 1.166 | 0.209 |
| 2.953 | 1.166 | 0.209 |
| 3.089 | 1.166 | 0.209 |
| 3.224 | 1.166 | 0.209 |
| −0.562 | 0.838 | 0.313 |
| −0.433 | 0.872 | 0.313 |
| −0.305 | 0.914 | 0.313 |
| −0.178 | 0.959 | 0.313 |
| −0.051 | 1.003 | 0.313 |
| 0.078 | 1.042 | 0.313 |
| 0.209 | 1.073 | 0.313 |
| 0.341 | 1.097 | 0.313 |
| 0.475 | 1.113 | 0.313 |
| 0.609 | 1.124 | 0.313 |
| 0.743 | 1.131 | 0.313 |
| 0.878 | 1.138 | 0.313 |
| 1.012 | 1.143 | 0.313 |
| 1.146 | 1.148 | 0.313 |
| 1.281 | 1.150 | 0.313 |
| 1.415 | 1.150 | 0.313 |

TABLE II-continued

| X | Y | Z' |
|---|---|---|
| 1.550 | 1.144 | 0.313 |
| 1.684 | 1.133 | 0.313 |
| 1.817 | 1.115 | 0.313 |
| 1.950 | 1.091 | 0.313 |
| 2.081 | 1.061 | 0.313 |
| 2.211 | 1.027 | 0.313 |
| 2.339 | 0.988 | 0.313 |
| 2.468 | 0.947 | 0.313 |
| 2.596 | 0.908 | 0.313 |
| 2.726 | 0.873 | 0.313 |
| 2.858 | 0.844 | 0.313 |
| 2.991 | 0.826 | 0.313 |
| 3.125 | 0.817 | 0.313 |
| 3.260 | 0.811 | 0.313 |
| −0.395 | 0.692 | 0.418 |
| −0.282 | 0.760 | 0.418 |
| −0.170 | 0.829 | 0.418 |
| −0.056 | 0.895 | 0.418 |
| 0.062 | 0.952 | 0.418 |
| 0.186 | 0.997 | 0.418 |
| 0.314 | 1.030 | 0.418 |
| 0.443 | 1.054 | 0.418 |
| 0.574 | 1.069 | 0.418 |
| 0.705 | 1.080 | 0.418 |
| 0.837 | 1.088 | 0.418 |
| 0.969 | 1.095 | 0.418 |
| 1.100 | 1.101 | 0.418 |
| 1.232 | 1.105 | 0.418 |
| 1.364 | 1.105 | 0.418 |
| 1.495 | 1.101 | 0.418 |
| 1.627 | 1.091 | 0.418 |
| 1.757 | 1.075 | 0.418 |
| 1.887 | 1.052 | 0.418 |
| 2.015 | 1.020 | 0.418 |
| 2.140 | 0.979 | 0.418 |
| 2.262 | 0.929 | 0.418 |
| 2.381 | 0.872 | 0.418 |
| 2.499 | 0.814 | 0.418 |
| 2.619 | 0.760 | 0.418 |
| 2.743 | 0.714 | 0.418 |
| 2.870 | 0.680 | 0.418 |
| 2.999 | 0.655 | 0.418 |
| 3.129 | 0.635 | 0.418 |
| 3.260 | 0.615 | 0.418 |
| −0.397 | 0.544 | 0.522 |
| −0.282 | 0.611 | 0.522 |
| −0.170 | 0.683 | 0.522 |
| −0.057 | 0.756 | 0.522 |
| 0.058 | 0.824 | 0.522 |
| 0.177 | 0.884 | 0.522 |
| 0.300 | 0.937 | 0.522 |
| 0.426 | 0.980 | 0.522 |
| 0.555 | 1.015 | 0.522 |
| 0.685 | 1.043 | 0.522 |
| 0.817 | 1.066 | 0.522 |
| 0.949 | 1.083 | 0.522 |
| 1.082 | 1.095 | 0.522 |
| 1.216 | 1.101 | 0.522 |
| 1.349 | 1.099 | 0.522 |
| 1.482 | 1.089 | 0.522 |
| 1.614 | 1.069 | 0.522 |
| 1.745 | 1.040 | 0.522 |
| 1.873 | 1.002 | 0.522 |
| 1.998 | 0.956 | 0.522 |
| 2.119 | 0.900 | 0.522 |
| 2.238 | 0.838 | 0.522 |
| 2.355 | 0.774 | 0.522 |
| 2.472 | 0.711 | 0.522 |
| 2.594 | 0.655 | 0.522 |
| 2.720 | 0.612 | 0.522 |
| 2.850 | 0.579 | 0.522 |
| 2.980 | 0.551 | 0.522 |
| 3.111 | 0.526 | 0.522 |
| 3.242 | 0.499 | 0.522 |
| −0.330 | 0.443 | 0.627 |
| −0.221 | 0.520 | 0.627 |
| −0.116 | 0.602 | 0.627 |
| −0.011 | 0.685 | 0.627 |

TABLE II-continued

| X | Y | Z' |
|---|---|---|
| 0.097 | 0.764 | 0.627 |
| 0.210 | 0.836 | 0.627 |
| 0.327 | 0.900 | 0.627 |
| 0.449 | 0.956 | 0.627 |
| 0.574 | 1.002 | 0.627 |
| 0.702 | 1.041 | 0.627 |
| 0.833 | 1.071 | 0.627 |
| 0.964 | 1.093 | 0.627 |
| 1.097 | 1.106 | 0.627 |
| 1.231 | 1.110 | 0.627 |
| 1.365 | 1.103 | 0.627 |
| 1.497 | 1.084 | 0.627 |
| 1.627 | 1.055 | 0.627 |
| 1.755 | 1.015 | 0.627 |
| 1.880 | 0.967 | 0.627 |
| 2.001 | 0.910 | 0.627 |
| 2.119 | 0.848 | 0.627 |
| 2.236 | 0.782 | 0.627 |
| 2.352 | 0.716 | 0.627 |
| 2.470 | 0.654 | 0.627 |
| 2.592 | 0.599 | 0.627 |
| 2.717 | 0.551 | 0.627 |
| 2.843 | 0.508 | 0.627 |
| 2.971 | 0.467 | 0.627 |
| 3.098 | 0.426 | 0.627 |
| 3.225 | 0.383 | 0.627 |
| −0.272 | 0.368 | 0.731 |
| −0.171 | 0.459 | 0.731 |
| −0.075 | 0.555 | 0.731 |
| 0.020 | 0.651 | 0.731 |
| 0.120 | 0.744 | 0.731 |
| 0.226 | 0.829 | 0.731 |
| 0.338 | 0.904 | 0.731 |
| 0.457 | 0.969 | 0.731 |
| 0.582 | 1.023 | 0.731 |
| 0.711 | 1.066 | 0.731 |
| 0.842 | 1.099 | 0.731 |
| 0.976 | 1.121 | 0.731 |
| 1.111 | 1.133 | 0.731 |
| 1.247 | 1.133 | 0.731 |
| 1.382 | 1.120 | 0.731 |
| 1.516 | 1.095 | 0.731 |
| 1.646 | 1.059 | 0.731 |
| 1.774 | 1.013 | 0.731 |
| 1.898 | 0.958 | 0.731 |
| 2.020 | 0.898 | 0.731 |
| 2.139 | 0.833 | 0.731 |
| 2.257 | 0.766 | 0.731 |
| 2.375 | 0.698 | 0.731 |
| 2.493 | 0.632 | 0.731 |
| 2.612 | 0.567 | 0.731 |
| 2.732 | 0.503 | 0.731 |
| 2.852 | 0.439 | 0.731 |
| 2.972 | 0.376 | 0.731 |
| 3.091 | 0.312 | 0.731 |
| 3.211 | 0.248 | 0.731 |
| −0.224 | 0.324 | 0.836 |
| −0.130 | 0.427 | 0.836 |
| −0.041 | 0.535 | 0.836 |
| 0.048 | 0.642 | 0.836 |
| 0.142 | 0.745 | 0.836 |
| 0.243 | 0.841 | 0.836 |
| 0.352 | 0.928 | 0.836 |
| 0.470 | 1.002 | 0.836 |
| 0.595 | 1.063 | 0.836 |
| 0.726 | 1.112 | 0.836 |
| 0.861 | 1.147 | 0.836 |
| 0.999 | 1.168 | 0.836 |
| 1.138 | 1.175 | 0.836 |
| 1.277 | 1.168 | 0.836 |
| 1.415 | 1.148 | 0.836 |
| 1.550 | 1.114 | 0.836 |
| 1.683 | 1.069 | 0.836 |
| 1.811 | 1.016 | 0.836 |
| 1.937 | 0.956 | 0.836 |
| 2.060 | 0.890 | 0.836 |
| 2.181 | 0.820 | 0.836 |
| 2.299 | 0.747 | 0.836 |
| 2.416 | 0.670 | 0.836 |
| 2.530 | 0.590 | 0.836 |
| 2.643 | 0.508 | 0.836 |
| 2.755 | 0.424 | 0.836 |
| 2.866 | 0.340 | 0.836 |
| 2.977 | 0.256 | 0.836 |
| 3.089 | 0.173 | 0.836 |
| 3.203 | 0.092 | 0.836 |

It will also be appreciated that the pressure and suction side surfaces of the shank disclosed in the above Tables I and II may be scaled up or down geometrically for use in other similar turbine designs. Consequently, the coordinate values set forth in Tables I and II may be scaled upwardly or downwardly such that the shank profile shape remains unchanged. A scaled version of the coordinates in Tables I and II would be represented by X, Y and Z' coordinate values of Tables I and II, with the non-dimensional Z' coordinate value converted to inches, and multiplied or divided by a constant number.

An important term in this disclosure is profile. The profile is the range of the variation between measured points on a shank surface and the ideal position listed in Tables I and II. As noted above, the actual profile on a manufactured blade will be different than those in Tables I and II, and the design is robust to this variation, meaning that mechanical function is not impaired. As also noted above, a + or −0.067 inch profile tolerance is used herein.

It should be noted that there are appendages on the shank, required for purposes other than transmission of loading from the airfoil to the dovetail, such as angel wings, seal pin slots, seal pin mate surfaces, damper pin slots, and damper pin mate surfaces. These appendages are not included in the profile defined claim in Tables I and II, above.

The disclosed shank shape optimizes and is specific to the machine condition and specification. It provides a unique profile that optimizes (1) the transmission of mechanical load from the airfoil to the bucket dovetail; (2) the weight of the part; (3) aeromechanical response of the part.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An article of manufacture including a bucket airfoil, a bucket dovetail to connect the bucket to a turbine wheel and a shank shape to connect the airfoil to the bucket dovetail, said shank having an uncoated nominal profile including a concave, pressure side, substantially in accordance with Cartesian values of X, Y and Z' set forth in Table I wherein the Z' values are non-dimensional values in a range from 0 to 1 convertible to Z distances in inches by multiplying the Z' values by shank height in inches, and wherein X and Y are distances in inches which, when connected by smooth continuing arcs, define a shank profile section at each distance Z, the profile sections being joined smoothly with one another to form a complete concave, pressure side, shank shape.

2. An article of manufacture according to claim 1, defining a turbine bucket forming part of a second stage of a turbine.

3. An article of manufacture according to claim 1, wherein said shank shape lies in an envelope within +/−0.067 inches in a direction normal to any shank surface location.

4. An article of manufacture according to claim 1, wherein the height of the shank from dovetail to platform is 3.445 inches.

5. An article of manufacture according to claim 1, wherein the X, Y and Z distances are scalable as a function of the same constant or number to provide a scaled-up or scaled-down bucket shank.

6. An article of manufacture including a bucket airfoil, a bucket dovetail to connect the bucket to a turbine wheel and a shank shape to connect the airfoil to the bucket dovetail, said shank having an uncoated nominal profile including a convex, suction side, substantially in accordance with Cartesian values of X, Y and Z' set forth in Table II wherein the Z' values are non-dimensional values in a range from 0 to 1 convertible to Z distances in inches by multiplying the Z' values by shank height in inches, and wherein X and Y are distances in inches which, when connected by smooth continuing arcs, define a shank profile section at each distance Z, the profile sections being joined smoothly with one another to form a complete convex, suction side, shank shape.

7. An article of manufacture according to claim 6, defining a turbine bucket forming part of a second stage of a turbine.

8. An article of manufacture according to claim 6, wherein said shank shape lies in an envelope within +/−0.067 inches in a direction normal to any shank surface location.

9. An article of manufacture according to claim 6, wherein the height of the shank from dovetail to platform is 3.445 inches.

10. An article of manufacture according to claim 6, wherein the X, Y and Z distances are scalable as a function of the same constant or number to provide a scaled-up or scaled-down bucket airfoil.

11. An article of manufacture comprising a turbine wheel having a plurality of buckets, each of said buckets including a bucket airfoil, a bucket dovetail to connect the bucket to a turbine wheel and a shank shape to connect the airfoil to the bucket dovetail, said shank having an uncoated nominal profile including a concave, pressure side, substantially in accordance with Cartesian values of X, Y and Z' set forth in Table I wherein the Z' values are non-dimensional values in a range from 0 to 1 convertible to Z distances in inches by multiplying the Z' values by shank height in inches, and wherein X and Y are distances in inches which, when connected by smooth continuing arcs, define a shank profile section at each distance Z, the profile sections being joined smoothly with one another to form a complete concave, pressure side, shank shape, and said shank nominal profile further including a convex, suction side, substantially in accordance with Cartesian values of X, Y and Z' set forth in Table II wherein the Z' values are non-dimensional values in a range from 0 to 1 convertible to Z distances in inches by multiplying the Z' values by shank height in inches, and wherein X and Y are distances in inches which, when connected by smooth continuing arcs, define a shank profile section at each distance Z, the profile sections being joined smoothly with one another to form a complete convex, suction side, shank shape.

12. An article of manufacture according to claim 11, defining a gas turbine and wherein the turbine wheel comprises a second stage of the turbine.

13. An article of manufacture according to claim 11, wherein X represents a distance parallel to the bucket dovetail.

14. An article of manufacture according to claim 11, wherein the Z height of the shank from dovetail to platform is 3.445 inches.

15. An article of manufacture according to claim 11, wherein the X, Y and Z distances are scalable as a function of the same constant or number to provide a scaled-up or scaled-down bucket shank.

16. An article of manufacture according to claim 15, wherein the turbine wheel comprises a second stage of the turbine.

17. An article of manufacture according to claim 15, wherein X represents a distance parallel to the bucket dovetail.

18. An article of manufacture according to claim 15, wherein the Z height of the shank from dovetail to platform is 3.445 inches.

19. An article of manufacture according to claim 15, said shank shape lying in an envelope within +/−0.067 inches in a direction normal to any shank surface location.

* * * * *